(12) United States Patent
Sato

(10) Patent No.: US 7,102,841 B1
(45) Date of Patent: Sep. 5, 2006

(54) RECORDING AND/OR REPRODUCING APPARATUS USING SIGNAL PROCESSING PROGRAM INFORMATION

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 09/614,524

(22) Filed: Jul. 12, 2000

(30) Foreign Application Priority Data

Jul. 13, 1999 (JP) ................................ P11-199477

(51) Int. Cl.
*G11B 5/02* (2006.01)

(52) U.S. Cl. ....................................................... 360/55
(58) Field of Classification Search .................. 360/69, 360/49, 132, 133, 72, 2, 60, 27, 55; 386/94, 386/97; 369/47.1
See application file for complete search history.

(56) References Cited

U.S. PATENT DOCUMENTS

| | | | | |
|---|---|---|---|---|
| 5,822,145 | A * | 10/1998 | Nishida et al. | 360/69 |
| 5,923,486 | A * | 7/1999 | Sugiyama et al. | 360/60 |
| 6,124,999 | A * | 9/2000 | Yamamoto | 360/69 |
| 6,134,066 | A * | 10/2000 | Takayama et al. | 360/60 |
| 6,532,269 | B1 * | 3/2003 | Yamada et al. | 375/265 |
| 6,754,026 | B1 * | 6/2004 | Koski | 360/73.04 |
| 7,035,040 | B1 * | 4/2006 | Molstad et al. | 360/77.12 |

* cited by examiner

*Primary Examiner*—Wayne Young
*Assistant Examiner*—Glenda P. Rodriguez
(74) *Attorney, Agent, or Firm*—Frommer Lawrence & Haug LLP; William S. Frommer; Thomas F. Presson

(57) ABSTRACT

Encoded data read by the various and upgraded encoding methods can be decode easily and inexpensively. A tape reading unit 1 is provided to read encoded A/V data and program data from a magnetic tape. A program data extractor 5 is provided to extract the program data from the data read from the magnetic tape. A controller 4 is provided to install the program data to a DSP 3. The DSP decodes the encoded A/V data based on the program data.

9 Claims, 4 Drawing Sheets

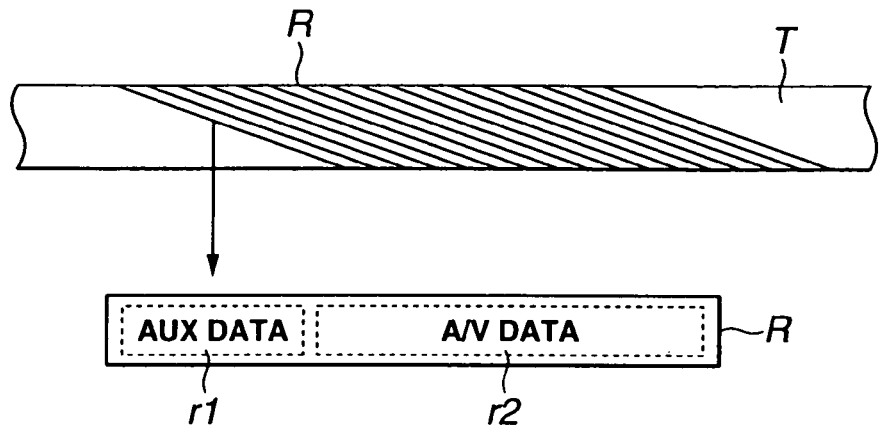
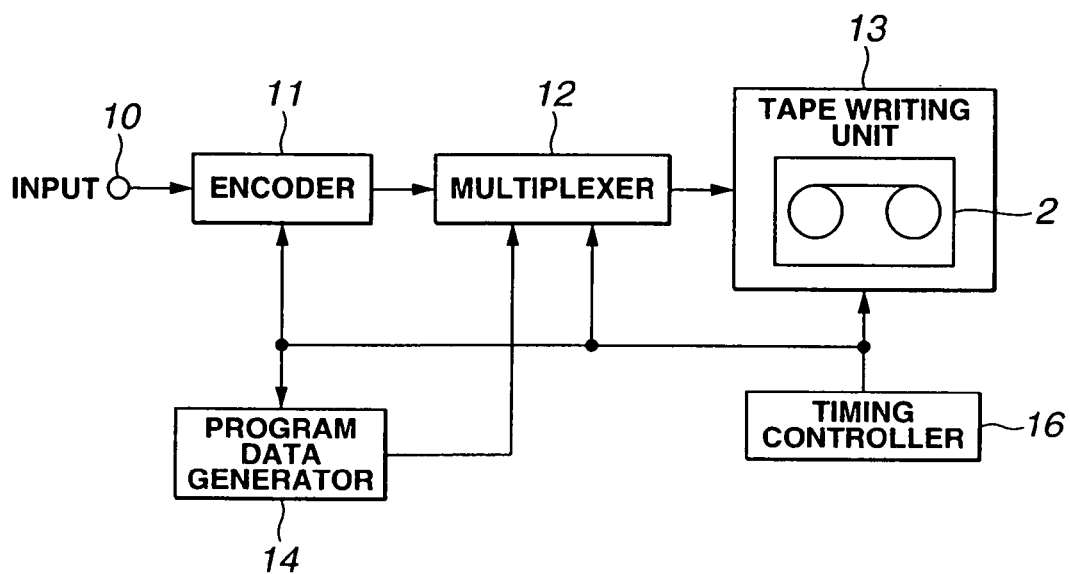

RECORDING AND/OR REPRODUCING APPARATUS USING SIGNAL PROCESSING PROGRAM INFORMATION

BACKGROUND OF THE INVENTION

1. Field of the Invention

The present invention relates to a recording apparatus in which encoded data is written to a recording medium, a reproducing apparatus in which encoded data read from a recording medium is decoded by the use of a digital signal processor (DSP), and a recording/reproducing apparatus having both of these functions.

2. Description of the Related Art

There has been proposed a reproducing apparatus or recording/reproducing apparatus in which encoded data read from a recording medium such as a magnetic tape is decoded by a DSP.

FIG. 1 shows a schematic view of a conventional reproducing apparatus in which encoded data read from a recording medium is decoded by a DSP.

As shown, the conventional reproducing apparatus includes a tape reading unit 101. The tape reading unit 101 has loaded therein a magnetic tape cassette 102 as a recording medium, which contains a magnetic tape having encoded data written thereon. The tape reading unit 101 reads the encoded data written on the magnetic tape in the magnetic tape cassette 102 and supplies the encoded data to a DSP 103.

The reproducing apparatus also includes a ROM (a read only memory) 105 having stored therein program data (decoding software) which is used by the DSP 103 to decode the encoded data. A controller 104 is provided to read the program data stored in the ROM 105 and supply the program data to the DSP 103 before the DSP 103 decodes the encoded data.

The DSP 103 decodes the encoded data based on the program data read from the ROM 105 and supplied from the controller 104. The data decoded by the DSP 103 is supplied to units provided downstream of a terminal 106.

Recently, a variety of encoding methods has been proposed, and conventional encoding methods have been upgraded repeatedly to have, for example, improved performance. Thus, decoding methods should be compatible with those various and upgraded encoding methods accordingly.

However, as in the above, the conventional reproducing apparatus in which encoded data read from the recording medium is decoded can support only a decoding method based on program data previously stored in the ROM. To support the above described various and upgraded encoding methods, the ROM has to be exchanged or its contents has to be renewed, which will require much time and expense since the user has to bring the reproducing apparatus to a service station or the like.

OBJECT AND SUMMARY OF THE INVENTION

It is therefore an object of the present invention to overcome the abovementioned drawbacks by providing a reproducing apparatus in which data encoded by the above described various and upgraded encoding methods can be decoded easily and inexpensively, a recording apparatus which can realize such decoding in the reproducing apparatus and a recording/reproducing apparatus having both of these functions.

According to the present invention, there is provided a reproducing apparatus including:

means for reading a signal written on a recording medium;

means for extracting signal processing program information written on the recording medium; and means for processing the signal read from the recording medium based on the signal processing program information.

According to the present invention, there is also provided a reproducing apparatus including:

means for reading a signal written on a recording medium;

means for reading signal processing program information from means for storing the signal processing program information, the storing means being attached to the recording medium; and means for processing the signal read from the recording medium based on the signal processing program information.

According to the present invention, there is also provided a recording apparatus including:

means for processing an input signal;

means for generating signal processing program information which inversely processes the processed input signal; and means for writing to a recording medium the processed input signal and the signal processing program information.

According to the present invention, there is also provided a recording apparatus including:

means for processing an input signal;

means for generating signal processing program information which inversely processes the processed input signal;

means for writing the processed input signal to a recording medium; and means for writing the signal processing program information to storing means attached to the recording medium.

According to the present invention, there is also provided a recoding/reproducing apparatus including:

a first means for processing an input signal;

means for generating signal processing program information which inversely processes the processed input signal;

means for writing to a recording medium the input signal processed by the first signal processing means and the signal processing program information;

means for reading a signal written on the recording medium;

means for extracting the signal processing program information written on the recording medium; and a second means for processing the signal read from the recording medium based on the signal processing program information.

According to the present invention, there is also provided a recoding/reproducing apparatus including:

a first means for processing an input signal;

means for generating signal processing program information which inversely processes the processed input signal;

means for writing the input signal processed by the first signal processing means to a recording medium;

means for writing the signal processing program information to storing means attached to the recording medium;

means for reading a signal written on the recording medium;

means for reading the signal processing program information from means for storing the signal processing program information, the storing means being attached to the recording medium; and a second means for processing the signal read from the recording medium based on the signal processing program information.

According to the present invention, data encoded by various and upgraded encoding methods can be decoded easily and inexpensively, by writing or storing program information, which is used for processing a signal written in the recording medium, to a recording medium or a storage means attached to the recording medium and processing the signal read from the recording medium based on the program information.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIGS. 3A and 3B show AUX data area and A/V data area of the magnetic tape for writing program data;

FIG. 4 shows a block diagram of the first embodiment of the recording apparatus employing the present invention;

DETAILED DESCRIPTION OF THE PREFERRED EMBODIMENTS

Referring to drawings, preferred embodiments of the present invention will be explained in detail.

Figure 1:
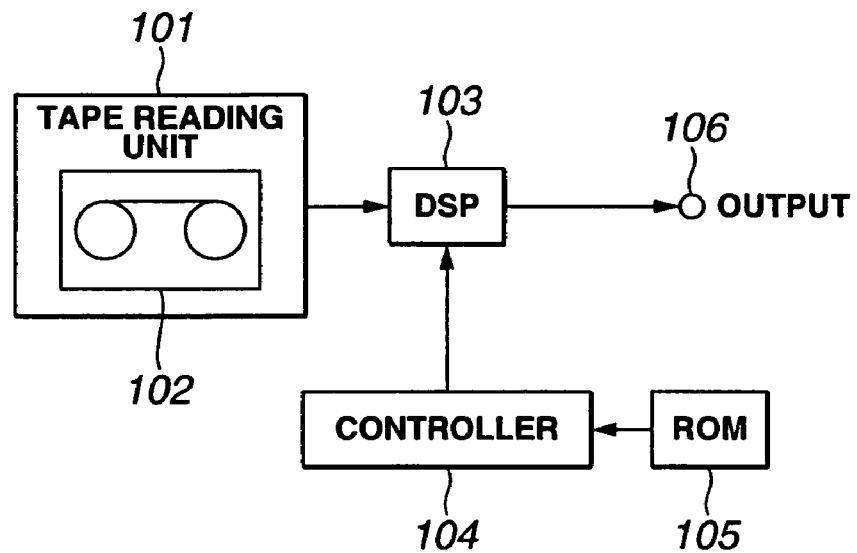
FIG. 1 shows a block diagram of a conventional reproducing apparatus.
Figure 2:
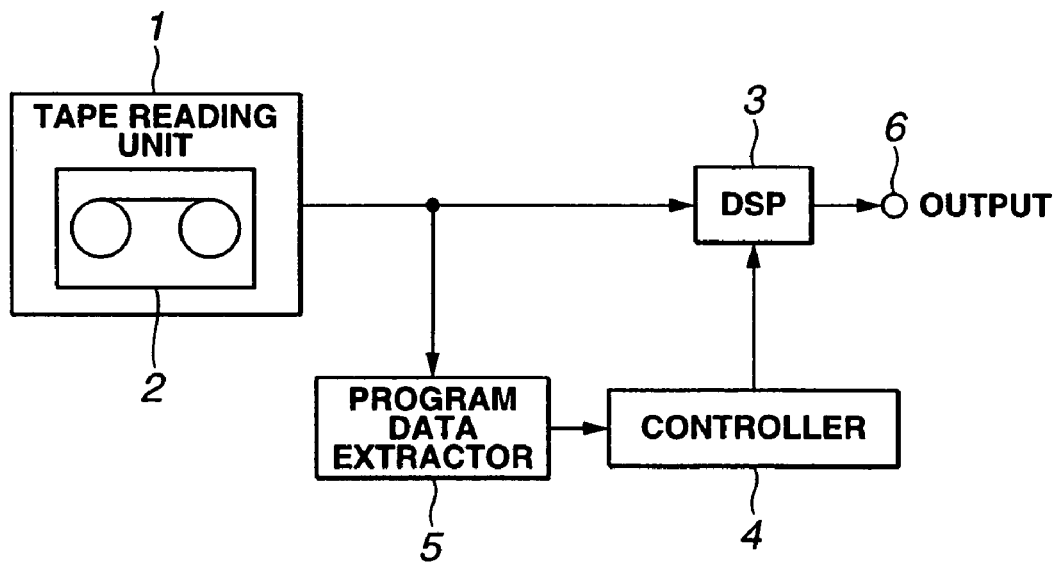
FIG. 2 shows a block diagram of a first embodiment of the reproducing apparatus employing the present invention.

Referring now to FIG. 2, there is illustrated a first embodiment of the reproducing apparatus according to the present invention.

As shown, in the first embodiment, a tape reading unit 1 has loaded therein a magnetic tape cassette 2 as a recording medium.

There are formed oblique recording tracks R on a magnetic tape T in the magnetic tape cassette 2, as shown in FIG. 3A, and each of the oblique recording tracks R consists of an AUX (auxiliary) data area r1 and an A/V (audio/video) data area r2, as shown in FIG. 3B. In the A/V data area r2, there is written audio/video data (for example, image program data) encoded by, for example, using the MPEG (moving picture experts group) method or in a digital video format. On the other hand, in the AUX data area r1, there is written program data (decoding software) as AUX data which is used by a DSP to decode the encoded A/V data.

The tape reading unit 1 reads the data written on the oblique recording tracks R on the magnetic tape T shown in FIG. 3 and supplies the read data to a DSP 3 and a program data extractor 5.

The program data extractor 5 extracts only the program data written in the AUX data area r1 from the data read from the oblique recording tracks R on the magnetic tape T by the tape reading unit 1 and sends the extracted program data to a controller 4.

The controller 4 installs the program data supplied from the program data extractor 5 to the DSP 3.

Thus, the DSP 3 can decode the encoded A/V data in accordance with the program data. The A/V data decoded by the DSP 103 is supplied to units provided downstream of a terminal 6.

The decoding program can be written in the AUX data areas r1 of plural tracks. In this case, the controller 4 judges that the decoding program is written over plural tracks and installs the decoding program as a consecutive program to the DSP 3.

Referring now to FIG. 4, there is illustrated the first embodiment of the recording apparatus according to the present invention, which writes the encoded A/V data and the program data to the oblique recording tracks R on the magnetic tape T.

As shown, the A/V data to be encoded is supplied as input to a terminal 10, and the A/V data is sent to an encoder 11.

The encoder 11 encodes the A/V data by a desired method such as, for example, the MPEG method or in a digital video format in accordance with a timing signal supplied from a timing controller 16 and sends the encoded A/V data to a multiplexer 12.

A program data generator 14 is provided to generate the program data which is used by the DSP to decode the A/V data encoded by the encoder 11 in accordance with the timing signal supplied from the timing controller 16. The program data is sent to the multiplexer 12.

The multiplexer 12 multiplexes the A/V data encoded by the encoder 11 and the program data generated by the program data generator 14 in accordance with the timing signal supplied from the timing controller 16 and sends the multiplexed data to a tape writing unit 13.

The tape writing unit 13 has loaded therein the magnetic tape cassette 2, and writes the data supplied from the multiplexer 12 to the magnetic tape in the magnetic tape cassette 2. Thus, the program data is written into the AUX data area r1, while the encoded A/V data is written into the A/V data area r2, as shown in FIG. 3. In other words, the multiplexer 12 multiplexes the encoded A/V data and the program data such that the program data is written into the AUX data area r1, while the encoded A/V data is written into the A/V data area r2.

The decoding program can be written in the AUX data areas r1 of plural tracks. In this case, the multiplexer 12 multiplexes the encoded data and the decoding program under the rule in case the decoding program is written over plural tracks.

As in the above, the first embodiment of the recording apparatus according to the present invention writes the program data repeatedly into the AUX data area r1 on the oblique recording tracks R on the magnetic tape T. So, when reading the magnetic tape T, the program data written in the AUX data area r1 can surely be obtained. Thus, the A/V data written in the A/V data area r2 can be decoded even if reproducing is started at an arbitrary position of the magnetic tape T.

The recording area on the magnetic tape T where the program data is written is not limited to a specific area such as the AUX data area r1 shown in FIG. 3. And, the program data can be written in other areas such as a header area attached to a recorded data.

As in the above, the first embodiment of the recording apparatus writes the program data in the recording area of the magnetic tape T. On the other hand, in a second embodiment, the program data is written into an external memory such as a removable semiconductor memory or a semiconductor memory attached to a magnetic tape cassette.

Figure 5:
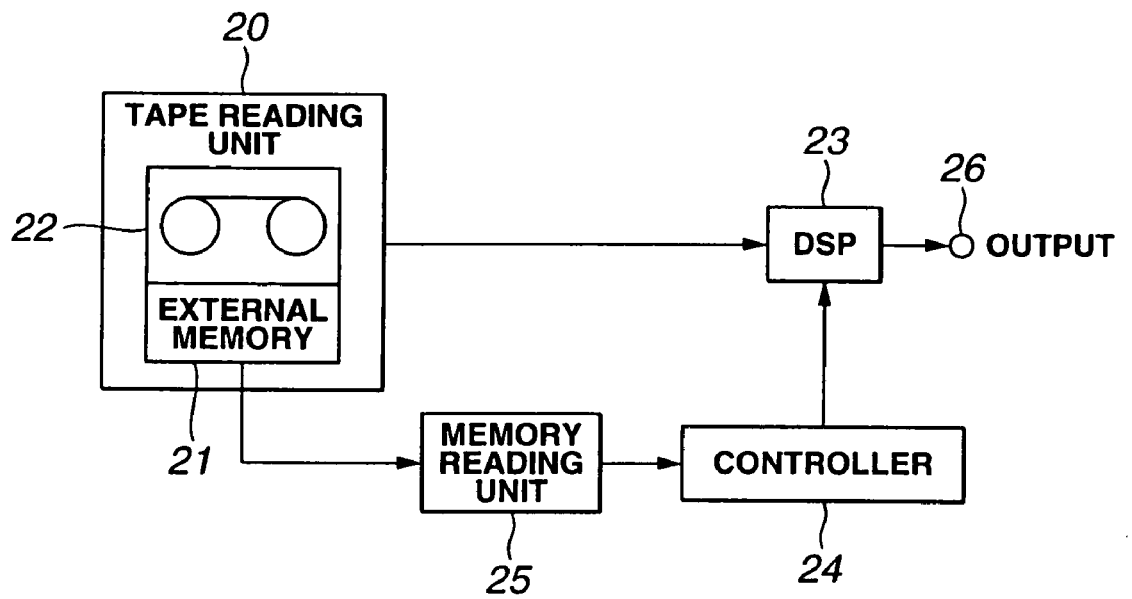
FIG. 5 shows a block diagram of a second embodiment of the reproducing apparatus employing the present invention.

Referring now to FIG. 5, there is illustrated the second embodiment of the reproducing apparatus according to the present invention.

As shown, in the second embodiment, a tape reading unit 20 has loaded therein a magnetic tape cassette 22 as a recording medium. There are formed oblique recording tracks on a magnetic tape in the magnetic tape cassette 22, and there is written audio/video data encoded by, for example, using the MPEG method or in a digital video format in each of the oblique recording tracks.

In the tape reading unit 20, there is provided an external memory 21 such as a removable semiconductor memory or a semiconductor memory attached to the magnetic tape cassette 22. In the external memory 21, there is written program data which is used to decode the encoded A/V data written on the magnetic tape.

The tape reading unit 20 reads the encoded A/V data written on the oblique recording tracks on the magnetic tape and supplies the read data to a DSP 23.

In the second embodiment, a memory reading unit 25 is provided to read the program data stored in the external memory 21. The program data read from the external memory 21 by the memory reading unit 25 is sent to a controller 24.

The controller 24 installs the program data supplied from the memory reading unit 25 to the DSP 23.

Thus, the DSP 23 can decode the encoded A/V data read from the magnetic tape by the tape reading unit 20 in accordance with the program data. The data decoded by the DSP 23 is supplied to units provided downstream of a terminal 26.

Figure 6:
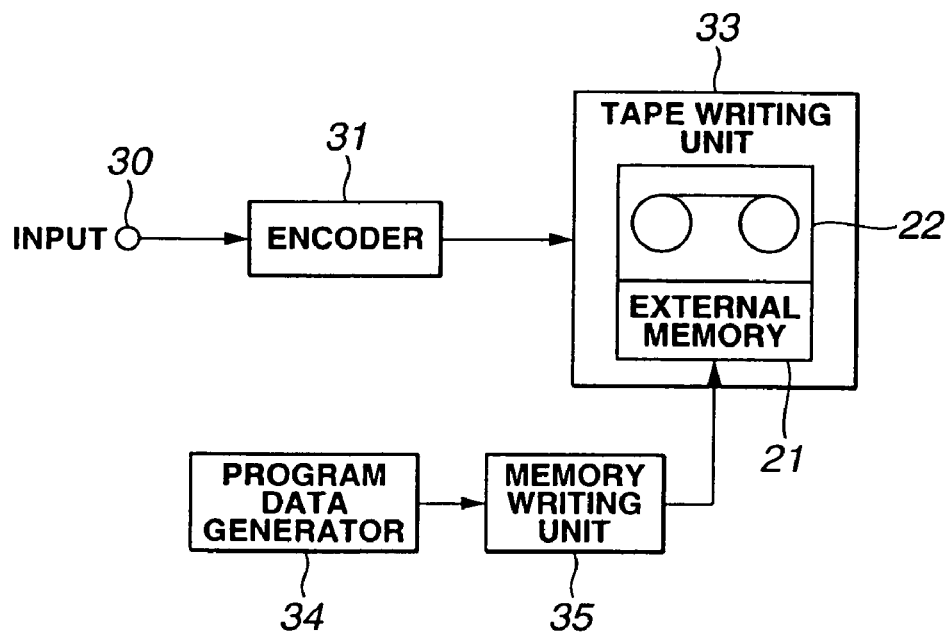
FIG. 6 shows a block diagram of the second embodiment of the recording apparatus employing the present invention.

Referring now to FIG. 6, there is illustrated the second embodiment of the recording apparatus according to the present invention, which writes the encoded A/V data to the magnetic tape and writes the program data to the external memory 21.

As shown, the A/V data to be encoded is supplied as input to a terminal 30, and the A/v data is sent to an encoder 31.

The encoder 31 encodes the A/V data by a desired method such as, for example, the MPEG method or in a digital video format and sends the encoded A/V data to a tape writing unit 33.

The tape writing unit 33 has loaded therein the magnetic tape cassette 22, and writes the data supplied from the encoder 31 to the magnetic tape in the magnetic tape cassette 22. Thus, the encoded A/V data is written on the magnetic tape.

In the tape writing unit 33, there is provided the external memory 21 such as a removable semiconductor memory or a semiconductor memory attached to the magnetic tape cassette 22.

A program data generator 34 generates the program data which is used by the DSP to decode the A/V data encoded by the encoder 31. The program data is sent to a memory writing unit 35.

The memory writing unit 35 writes the program data to the external memory 21.

With regard to the external memory 21, the recording method for writing the program data depends on its type. That is, when a mask ROM is used as the external memory 21, the program data is written during the semiconductor manufacturing process. On the other hand, when a flash memory, a ferroelectric memory, an EEPROM is used as the external memory 21, the program data is written after the semiconductor manufacturing process by a recording apparatus in accordance with their respective memory types.

As in the above, the second embodiment of the recording apparatus writes the program data to the external memory 21 such as a removable semiconductor memory or a semiconductor memory attached to a magnetic tape cassette. Thus, when reading the magnetic tape, the A/V data written on the magnetic tape can be decoded by reading the program data from the external memory 21.

As in the above, in the first and second embodiment, a magnetic tape is used as the recording medium for the encoded A/V data. On the other hand, a disc-shaped recording medium can also be used as the recording medium.

Figure 7:
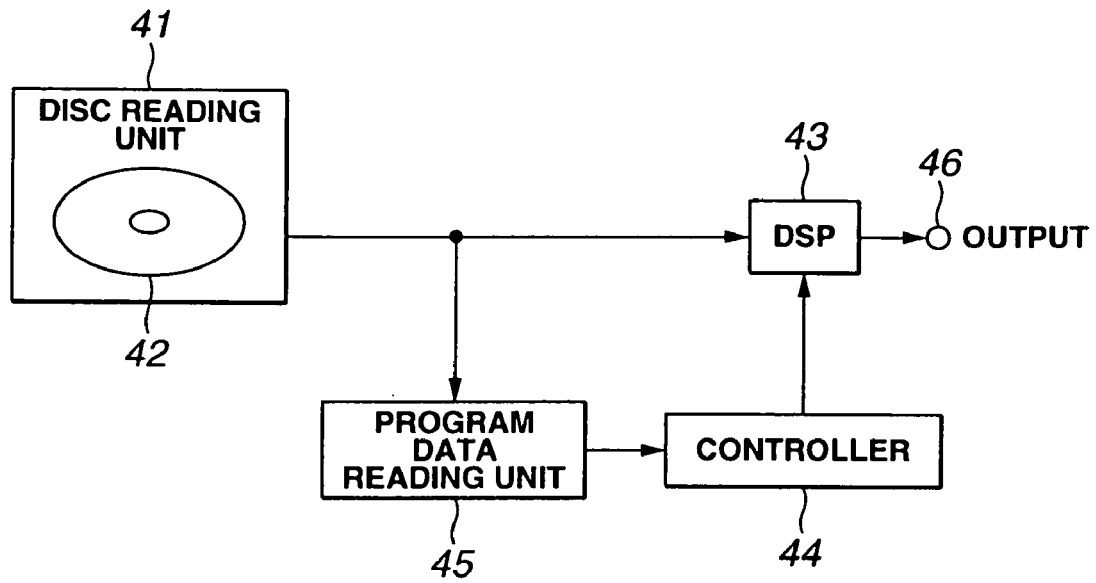
FIG. 7 shows a block diagram of a third embodiment of the reproducing apparatus employing the present invention.

Referring now to FIG. 7, there is illustrated a third embodiment of the reproducing apparatus according to the present invention, in which a disc-shaped recording medium (referred to as a disc, hereinafter) is used as the recording medium.

As shown, in the third embodiment, a disc reading unit 41 has loaded therein a disc 42 as a recording medium. There are formed concentric or spiral recording tracks on the disc 42, where there is written the audio/video data encoded by, for example, the MPEG method or in a digital video format. In a specific area, for example in a innermost circumference, there is written the program data which is used to decode the encoded A/V data written on the recording tracks of the disc 42.

At first, the disc reading unit 41 reads the program data written in the specific area of the disc 42 and supplies the program data to a program data reading unit 45. The program data supplied to the program data reading unit 45 is sent to a controller 44.

The controller 24 installs the program data supplied from the program data reading unit 45 to a DSP 43.

Next, the disc reading unit 41 reads the encoded A/V data from the recording tracks of the disc 42 and supplies the read data to the DSP 43.

Thus, the DSP 43 can decode the encoded A/V data read from the disc 42 by the disc reading unit 41 in accordance with the program data. The A/V data decoded by the DSP 43 is supplied to units provided downstream of a terminal 46.

Figure 8:
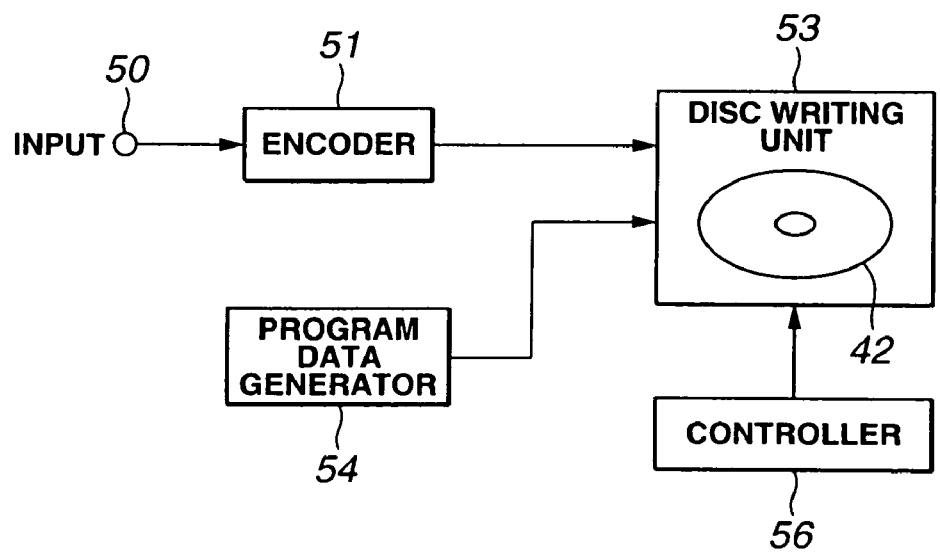
FIG. 8 shows a block diagram of the third embodiment of the recording apparatus employing the present invention.

Referring now to FIG. 8, there is illustrated the third embodiment of the recording apparatus according to the present invention, which writes the encoded A/V data to the disc 42 and writes the program data to the specific area of the disc 42.

As shown, a program data generator 54 generates the program data which is used by the DSP to decode the A/V data encoded by an encoder 51. The program data is sent to a disc writing unit 53.

The disc writing unit 53 has loaded therein the disc 42, and writes the program data supplied from the program data generator 54 to the specific area of the disc 42 under the control of a controller 56.

The A/V data to be encoded is supplied as input to a terminal 50, and the A/V data is sent to the encoder 51.

The encoder 51 encodes the A/V data by a desired method such as, for example, the MPEG method or in a digital video format and sends the encoded A/V data to the disc writing unit 53.

The disc writing unit 53 writes the data supplied from the encoder 51 to the disc 42 under the control of the controller 56. Thus, the encoded A/V data is written on the disc 42.

As in the above, the third embodiment of the recording apparatus writes the program data to the specific area of the disc 42. Thus, when reading the disc 42, the A/V data written in the disc 42 can be decoded by reading the program data from the specific area of the disc 42.

As in the above, according to each of the embodiments of the present invention, decoding methods can be compatible with various and upgraded encoding methods by writing a encoding method (compression methods etc.) compatible with the DSP specification and encoded A/V data to a recording medium.

Reproducing apparatuses and recording apparatuses are illustrated in the above described embodiments. On the other hand, the present invention can be applied to recording/reproducing apparatuses having both of these functions.

While the present invention has been described with reference to specific embodiments chosen for purpose of illustration. It should be apparent that numerous modifications could be made thereto by those skilled in the art without departing from the basic concept and scope of the present invention.

What is claimed is:

1. A recording method comprising:
   receiving audio/video data to be written to a recording medium;
   encoding said audio/video data using a given encoding method,
      wherein said given encoding method is in accordance with a timing signal supplied from a timing controller that sends encoded audio/video data to a multiplexer;
   receiving a decoding program, wherein said decoding program is configured in a reverse process from said given encoding method such that said decoding program is capable of decoding said encoded audio/video data,
      wherein a program data generator is proved to generate said decoding program which is used by a DSP in accordance with the timing signal supplied from the timing controller; and
   writing both said encoded audio/video data and said decoding program onto said recording medium,
      wherein a tape writing unit has loaded therein said recording medium and writes said audio/video data supplied to said multiplexer to said recording medium.

2. The recording method of claim 1, wherein said writing both said audio/video data and said decoding program includes
   writing said audio/video data and said decoding program onto oblique recording tracks.

3. The recording method of claim 1, further comprising writing said decoding program to storage means coupled to said recording medium.

4. A recording method comprising:
   receiving audio/video data to be written to a recording medium;
   encoding said audio/video data using a given encoding method,
      wherein said given encoding method is in accordance with a timing signal supplied from a timing controller that sends encoded audio/video data to a multiplexer;
   receiving a decoding program, wherein said decoding program is configured in a reverse process from said given encoding method such that said decoding program is capable of decoding said encoded audio/video data,
      wherein a program data generator is proved to generate said decoding program which is used by a DSP in accordance with the timing signal supplied from the timing controller;
   writing said audio/video data onto said recording medium; and
   writing said decoding program to storage means coupled to said recording medium,
      wherein a tape writing unit has loaded therein said recording medium and writes said audio/video data supplied to said multiplexer to said recording medium.

5. A recording apparatus comprising:
   first receiving means for receiving audio/video data to be written to a recording medium;
   encoding means for encoding said audio/video data using a given encoding method,
      wherein said given encoding method is in accordance with a timing signal supplied from a timing controller that sends encoded audio/video data to a multiplexer;
   second means for receiving a decoding program, wherein said decoding program is configured in a reverse process from said given encoding method such that said decoding program is capable of decoding said encoded audio/video data,
      wherein a program data generator is proved to generate said decoding program which is used by a DSP in accordance with the timing signal supplied from the timing controller; and
   writing means for writing both said audio/video data and said decoding program onto said recording medium,
      wherein a tape writing unit has loaded therein said recording medium and writes said audio/video data supplied to said multiplexer to said recording medium.

6. A reproducing method comprising:
   reading audio/video data written on a recording medium, wherein said audio/video data was encoded using a given encoding method,
      wherein said given encoding method is in accordance with a timing signal supplied from a timing controller that sends encoded audio/video data to a multiplexer;
   reading a decoding program written on said recording medium, wherein said decoding program is configured in a reverse process from said given encoding method such that said decoding program is capable of decoding said encoded audio/video data,
      wherein a program data generator is proved to generate said decoding program which is used by a DSP in accordance with the timing signal supplied from the timing controller; and
   decoding said audio/video data using said decoding program.

7. A recording/reproducing method comprising:
   receiving audio/video data to be written to a recording medium;
   encoding said audio/video data using a given encoding method,
      wherein said given encoding method is in accordance with a timing signal supplied from a timing controller that sends encoded audio/video data to a multiplexer;
   receiving a decoding program, wherein said decoding program is configured in a reverse process from said given encoding method such that said decoding program is capable of decoding said encoded audio/video data,
    wherein a program data generator is proved to generate said decoding program which is used by a DSP in accordance with the timing signal supplied from the timing controller;
writing both said audio/video data and said decoding program onto said recording medium,
    wherein a tape writing unit has loaded the in said recording medium and writes said audio/video data supplied to said multiplexer to said recording medium;
reading said audio/video data written on said recording medium;
reading said decoding program written on said recording medium; and
decoding said audio/video data using said decoding program.

8. A recording/reproducing method comprising:
receiving audio/video data to be written to a recording medium;
encoding said audio/video data using a given encoding method,
    wherein said given encoding method is in accordance with a timing signal supplied from a timing controller that sends encoded audio/video data to a multiplexer;
receiving a decoding program, wherein said decoding program is configured in a reverse process from said given encoding method such that said recording program is capable of decoding said encoded audio/video data,
    wherein a program data generator is proved to generate said decoding program which is used by a DSP in accordance with the timing signal supplied from the timing controller;
writing said audio/video data onto said recording medium;
writing said decoding program to storage means coupled to said recording medium,
    wherein a tape writing unit has loaded therein said recording medium and writes said audio/video data supplied to said multiplexer to said recording medium;
reading said audio/video data written on said recording medium;
reading said decoding program written on said storage means coupled to said recording medium; and
decoding said audio/video data using said decoding program.

9. A recording/reproducing apparatus comprising:
first receiving means for receiving audio/video data to be written to a recording medium;
encoding means for encoding said audio/video data using a given encoding method,
    wherein said given encoding method is in accordance with a timing signal supplied from a timing controller that sends encoded audio/video data to a multiplexer;
second receiving means for receiving a decoding, program, wherein said decoding program is configured in a reverse process from said given encoding method such that said decoding program is capable of decoding said encoded audio/video data,
    wherein program data generator is proved to generate said decoding program which is used by a DSP, in accordance with the timing signal supplied from the timing controller;
writing means for writing both said audio/video data and said decoding program onto said recording medium,
    wherein a tape writing unit has loaded therein said recording medium and writes said audio/video data supplied to said multiplexer to said recording medium;
first reading means for reading said audio/video data written on said recording medium;
second reading means for reading said decoding program written on said recording medium; and
decoding means for decoding said audio/video data using said decoding program.

\* \* \* \* \*